March 17, 1964      E. BURALLI      3,125,308
APPARATUS FOR WINDING A COIL ON A TOROIDAL CORE
Filed Nov. 15, 1961
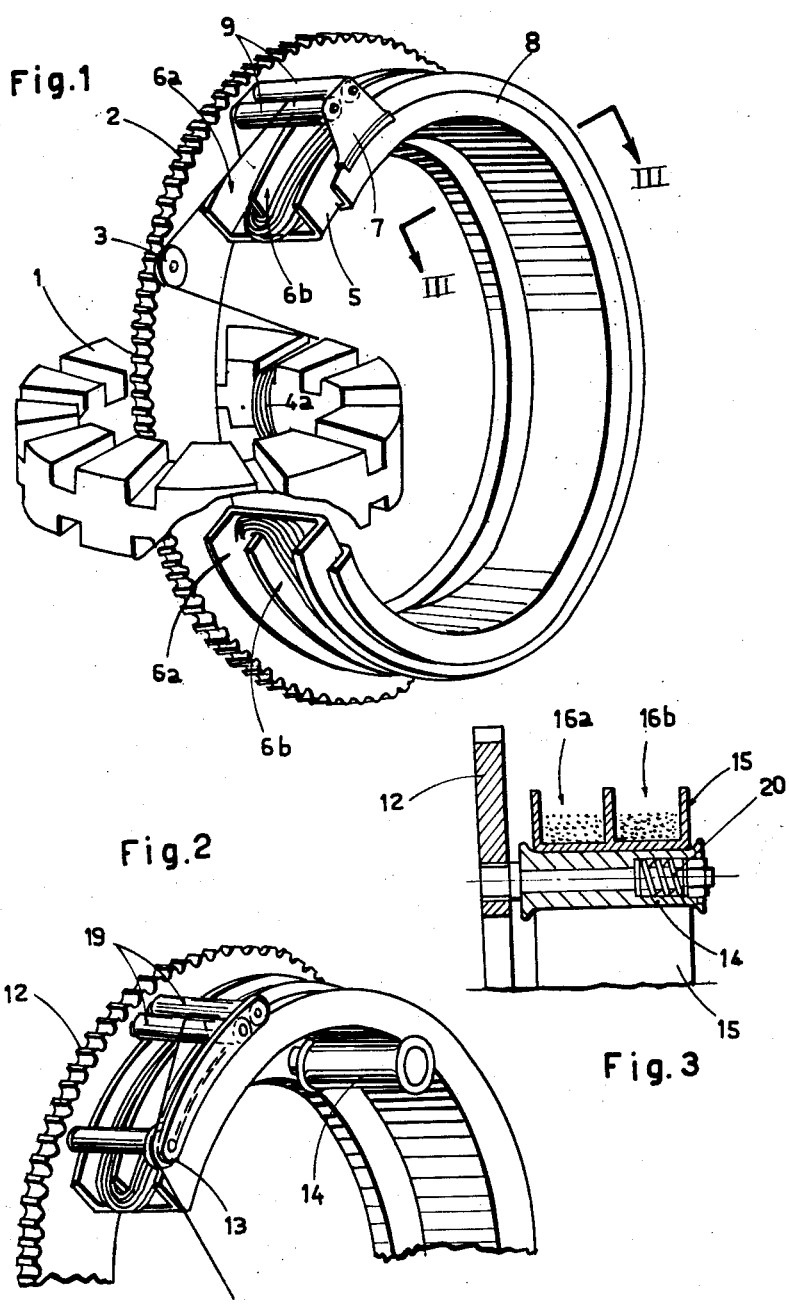
INVENTOR:
ETTORE BURALLI United States Patent Office 3,125,308
Patented Mar. 17, 1964

3,125,308
APPARATUS FOR WINDING A COIL ON A TOROIDAL CORE
Ettore Buralli, Florence, Italy, assignor to Remital Società per Azioni Studio e Realizzazioni Elettromeccaniche, Florence, Italy, a corporation of Italy
Filed Nov. 15, 1961, Ser. No. 152,976
Claims priority, application Italy Nov. 19, 1960
7 Claims. (Cl. 242—4)

The present invention relates to apparatus for winding coils on toroidal cores.

More particularly the invention comprises a driven annular structure, a freely circularly reciprocable gapped annular shuttle member concentric with the driven structure and having two parallel peripheral channels open at both ends and a supply of wire or similar filamentary material stretched into two substantially parallel arcuate reaches so wound upon the shuttle that the supply is disposed in the arcuate channels. Wire guiding means are mounted on the driven structure. The wire guiding means lifts the wire radially outwardly from the parallel channels and feeds it around the toroidal core which is being wound. Since the shuttle is free to rotate in either direction, the wire is wound continuously around the toroidal core while the shuttle rotates in one direction for unwinding wire from one of the two reaches and in the opposite direction for the other arcuate reach. For this purpose, a reversible pull feed guide is provided on the driven structure.

The invention will be better understood following the description and the accompanying drawing, which illustrates preferred embodiments of the invention. In the drawing:

FIG. 1 illustrates a diagrammatical perspective view of the shuttle, connected to the circular rim bearing the wire-guide;

FIG. 2 is a fragmentary perspective view illustrating a modification of the shuttle and its supporting means;

FIG. 3 is a local cross-section of this variation of embodiment.

According to what is illustrated in FIGS. 1 and 2, 1 denotes generally a radially slotted toroidal core around which the coils are to be wound, for instance, a stator structure for an axial gap induction motor, provided with a plurality of pairs of diametrically aligned radial grooves on the front face thereof. 2 denotes a geared rim which carries the wire guide roller 3 in a continuous circular path concentric with the ring 1. For this purpose the rim 2 may be formed as a closably gapped ring to allow the insertion of the core 1 and to allow the release thereof from rim 2. The wire for the forming of the windings (such as those indicated by 4a) around the cross-section of the core 1, is supplied according to the invention, by a shuttle hereinafter described, which is developed for a circular rim sector, instead of under the form of a complete circular rim, which would impose the supply, that is, the filling of the shuttle, with the wire after the matching thereof to the ring 1, and only for the amount of wire required to effect the windings on the ring 1.

The shuttle according to the invention, in order to avoid this disadvantage, is formed by an element 5 having the development of a circular rim and forming two grooves or channels located side-by-side 6a, 6b and communicating each other at the ends which may also be open ended. The channels 6a and 6b hold a supply of wire or the like to be wound shaped as two stretched substantially parallel arcuate reaches. The wire assembly is wound with slightly less than a half turn lying in a channel and with the corresponding half turn lying in the other channel of the gapped annular shuttle.

Advantageously, the shuttle may be filled at any time and supplied with a suitable amount of wire, different from the wire later to be required and sufficient for the forming of a particular winding; more specifically the shuttle may store an amount of wire sufficient to serve for the windings of a plurality of cores.

In order to effect the regular paying-off of the wire, there is provided a carriage or slide 7 which is mounted on sliding guides or ways 8 provided laterally to the shuttle 5, in such a manner that the carriage may slide with a restricted friction on the guides. The carriage bears a pair of reversible pull feed guide rollers 9 which are arranged radially outwardly of the channels of the shuttle and which are approached to the channels in such a manner that the wire issuing from the shuttle magazine passes through the rollers and is continuously guided towards the wire-guide 3 regardless of the direction from which the wire is fed to the pair of cylinders 9.

During the pay-off of the wire for the forming of the winding on the stator 1 and thus the continuous unidirectional rotation of the rim 2 and to have the circular trajectory of the wire-guide 3, the shuttle which is freely movable on suitable guide rollers (in general operating on the outside, for instance, on the edges of the channels) effects a circular reciprocatory movement with respect to the rim 2 which rotates, the movement being given by the return operated by the wire. In practice one may also have some restricted oscillations of the carriage 7 with respect to the wire-guide 3 and some pendular excursions of the shuttle 5, 8 with respect to the rim 2.

According to the modified embodiment of FIG. 2, the rim 12 carries the wire-guide 13 axially displaced at the outside with respect to the shuttle 15, which is freely supported by rollers 14, borne by the geared rim 12 and which guide the shuttle by engagement with its internal surface. The wire is wound in a series of convolutions as in the previous example with a half-turn in the channel 16a and the other half turn in the channel 16b. There is provided, as in the previous case, a pair of reversible pull feed guide rollers 19 located side-by-side, which however—differently with respect to the former case—are borne instead by a carriage, directly connected to the geared rim 12. There are provided appropriate friction means to restrain the relative movements between the rim 12 and the shuttle 15, said friction means may however be made; for instance, there may be provided the forming of adjustable spring-pressed friction brakes such as those indicated by 20 in FIG. 3 to assure frictional resistance to the rotation of the support rollers 14 for the shuttle 15. Alternatively, there may be provided another supporting means of the shuttle 15 and centering thereof through sliding means instead of rolling means such as the rollers 14. The arrangement must be such as to prevent spontaneous movements of the shuttle with respect to the rim 2, by effect of inertia and by other effects, except those caused by the traction effect determined by the wire being payed-off.

While I have shown and described what I believe to be the best embodiments of my invention, it will be apparent to those skilled in the art that various changes and modifications may be made therein without departing from the spirit and scope of the invention as defined in the appended claims.

What I claim is:

1. Apparatus for winding coils of wire or the like on annular cores, comprising: an annular structure, means supporting said annular structure for rotation about its axis, said structure being adapted to pass through the central aperture of an annular core being wound with a coil of wire or the like, a split ring having a pair of substantially parallel wire holding channels in its outer face, said split ring being substantially coaxially mounted on said annular structure by guide means interconnecting and permitting relative coaxial oscillation between said annular structure and said split ring, means for holding a coil of wire stretched into two substantially parallel arcuate reaches lying in said channels, a reversible pull feed guide for said wire overlying said channels and fixed to said annular structure, and a winding guide for said wire also fixed to said annular structure and spaced from said feed guide.

2. Apparatus according to claim 1, said guide means for said split ring having sliding engagement with said split ring of a frictional value sufficient to maintain a predetermined desired tension in the wire being payed out from said channels.

3. Apparatus according to claim 1, said reversible pull guide means comprising a plurality of parallel rollers spaced around said annular structure and supportingly engaging an inwardly facing annular surface of said split ring.

4. Apparatus according to claim 3, said rollers including supporting axles and adjustable means for varying the friction between at least one of said rollers and its supporting axle to control the tension in the wire being payed out from said channels.

5. Apparatus according to claim 4, said adjustable means being a coil spring mounted within a coaxial bore in said one roller and a nut threaded to said axle for varying the compression of said spring and thereby its braking action between said roller and its axle.

6. Apparatus according to claim 1, said channels being defined by three upstanding substantially parallel flanges, the medial one of which constitutes said means for holding said coil of wire stretched around the ends thereof.

7. Apparatus according to claim 1, said reversible pull guide means being a pair of rollers overlying said split ring parallel to the axis thereof.

References Cited in the file of this patent
UNITED STATES PATENTS
2,331,674  Fox _____ Oct. 12, 1943
FOREIGN PATENTS
660,218  Great Britain _____ Oct. 31, 1951